United States Patent [19]

Stenzenberger

[11] 4,239,883

[45] Dec. 16, 1980

[54] POLYIMIDE PREPARATION FROM IMIDO ACYL HALIDE

[75] Inventor: Horst Stenzenberger, Dossenheim, Fed. Rep. of Germany

[73] Assignee: Technochemie GmbH Verfahrenstechnik, Heidelberg, Fed. Rep. of Germany

[21] Appl. No.: 703,548

[22] Filed: Jul. 8, 1976

[30] Foreign Application Priority Data

Jul. 9, 1975 [DE] Fed. Rep. of Germany ....... 2530571

[51] Int. Cl.$^3$ ...................... C08G 69/26; C08G 73/10
[52] U.S. Cl. .............................. 528/322; 260/30.4 N; 260/32.8 N; 260/37 N; 428/473.5; 428/318; 528/12; 528/26; 528/170; 528/312; 528/321; 156/307.3
[58] Field of Search .................. 528/322, 312, 321, 12, 528/26, 170

[56] References Cited

U.S. PATENT DOCUMENTS 3,717,615  2/1973  Holub et al. .................... 260/78 UA

*Primary Examiner*—Harold D. Anderson
*Attorney, Agent, or Firm*—Schwartz, Jeffery, Schwaab, Mack, Blumenthal & Koch

[57] ABSTRACT

Novel polyimide prepolymers are produced by reacting an unsaturated dicarboxylic acid imido acylchloride with a difunctional amine to produce the corresponding acid amide. Condensation of said reactants is preferably effected in solution in a low boiling solvent. The resulting prepolymer is hardened and completely polymerized by heating, preferably between about 80° C. and about 400° C., to yield a cross-linked, substantially infusible and insoluble polyimide resin and articles made therefrom.

17 Claims, No Drawings

POLYIMIDE PREPARATION FROM IMIDO ACYL HALIDE

BACKGROUND OF THE INVENTION

(1) FIELD OF THE INVENTION

The present invention relates to novel polyimides and their polymerizable prepolymerization products as well as to a process of making such polymerizable prepolymerization products and to the use of such prepolymerization products for producing highly cross-linked, insoluble, and infusible polyimide resins of excellent thermal, electrical, and mechanical properties.

(2) DESCRIPTION OF THE PRIOR ART

French Pat. No. 1,555,564 describes the preparation of polyimide prepolymerization products by reacting bis-maleimides of the general formula

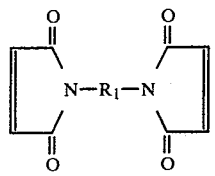

with difunctional amines of the general formula

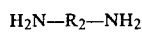

Specific and predetermined proportions of said reactants are used in producing the prepolymers. The resulting prepolymers can be converted into insoluble and infusible, crosslinked polyimide resins by heating the prepolymers to a temperature between about 100° C. and about 400° C. until polymerization is completed. When proceeding in this manner, cross-linked polyimides with valuable properties such as remarkable stability at high temperatures, high mechanical strength properties, and excellent dielectric properties are obtained. In said reaction of the bis-maleimides with the difunctional amines, the free amino groups react with the double bond of the maleimide molecule. Prepolymers with terminal maleimide groups are produced by said reaction. Cross-linked polymers are obtained from said prepolymers by the action of heat causing polymerization of the maleic acid double bond. Prepolymerization can be effected in solution or in the melt. The prepolymerization reaction proceeds only at temperatures of about 150° C. at such a speed that a technically satisfactory manufacture is possible. The preparation of uniform prepolymerization products by means of the above described process is rather difficult and can not always be carried out with reproducible results because, during the preparation of the prepolymer at the temperature of 150° C., polymerization of excess maleimide groups takes place to an appreciable extent at the same time.

Furthermore, when proceeding in the manner described in said patent the possibility exists that unreacted difunctional amine is still present. Its presence in the prepolymer, however, is physiologically not without danger on subsequently using the prepolymer.

SUMMARY OF THE INVENTION

It is one object of the present invention to provide a novel and highly advantageous prepolymer obtained by reaction of a difunctional amine with an unsaturated dicarboxylic acid into acid halide, said prepolymer being convertible by heating into a polyimide resin of excellent thermal electrical, and mechanical properties.

Another object of the present invention is to provide a simple and effective process of producing such a valuable prepolymer.

A further object of the present invention is to provide novel and highly advantageous polyimide polymers of high thermal stability and other advantageous properties.

Still another object of the present invention is to provide a simple and effective process of producing such a valuable polyimide polymer.

Another object of the present invention is to provide a novel unsaturated dicarboxylic acid imido acyl halide useful as the one reactant in the preparation of the prepolymer.

Other objects of the present invention and advantageous features thereof will become apparent as the description proceeds.

In principle the present invention comprises a process of producing valuable polyimide prepolymers which process is substantially free of the disadvantages of the known processes and which consists in reacting a difunctional amine with an acid halogenide of Formula I

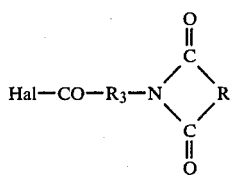

In said Formula I $R_3$ is a group which is substituted by the unsaturated dicarboxylic acid imido group

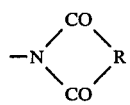

while

Hal is halogen and

R is the hydrocarbon group to which the dicarboxylic acid imido group is attached.

As a result of said reaction polyimide prepolymers which can be converted by the action of heat into polyimide resins which are highly resistant to and substantially unaffected by high temperatures, are produced.

The reaction of the difunctional amine with the acid halide of Formula I is preferably carried out in such a manner that the molar proportion of difunctional amine to acid halide is between about 1:2 and about 1:1. The resulting polyimide prepolymers consist, depending upon the molar reaction proportion of the reactants, of a mixture of the following two compounds of Formulas II and III:

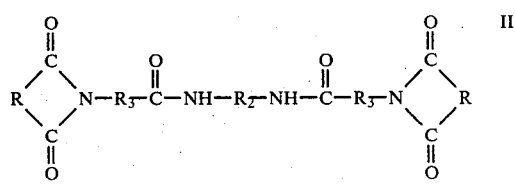

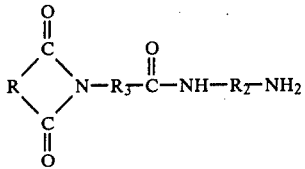

In said Formulas II and III

R$_2$ and R$_3$ indicate alkylene with 1 to 12 carbon atoms, cycloalkylene with 5 to 6 carbon atoms, a heterocyclic group with 4 to 5 carbon atoms and at least one nitrogen, oxygen, or sulfur atom in the heterocyclic ring, a mono- or dicarbocyclic aromatic group or at least two mono- or dicarbocyclic aromatic or cycloalkylene groups which are connected with each other by direct carbon to carbon bonds or by a bivalent group selected from the group consisting of oxygen, sulfur, alkylene with 1 to 3 carbon atoms, or groups of the following Formulas

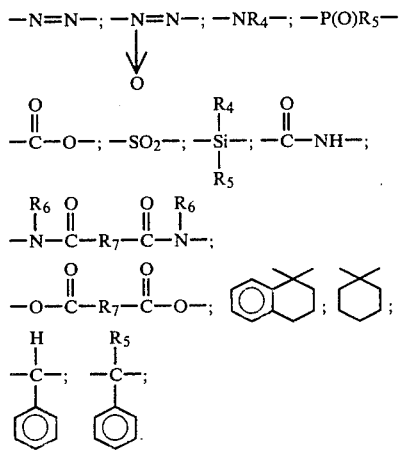

In said Formulas

R$_4$, R$_5$, R$_6$ are alkyl with 1 to 6 carbon atoms, cycloalkyl with 5 to 6 carbon atoms, or mono- or dicarbocyclic aryl, and R$_7$ is alkylene with 1 to 12 carbon atoms, aycloalkylene with 5 to 6 carbon atoms, or mono- or dicarbocyclic arylene; while R in the compounds of Formulas II and III indicates groups of the following Formulas:

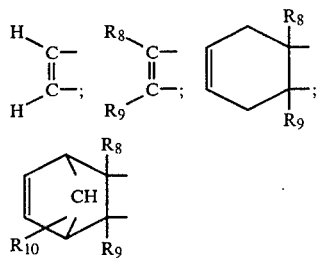

R$_8$, R$_9$, and R$_{10}$ in said Formulas may be the same or they may differ from each other. They indicate hydrogen or alkyl with 1 to 6 carbon atoms.

The above characterized polyimide prepolymers are preferably prepared according to the present invention by first producing a solution of the bifunctional amine in an inert solvent with the addition of an acid binding agent, preferably a tertiary amine, and adding drop by drop to said solution a solution of the acid halide of Formula I while stirring, in such a manner that the temperature does not substantially exceed room temperature. The reaction of the acid halide, preferably the acid chloride, with the difunctional amine is preferably carried out in a water immiscible solvent of a low boiling point, preferably in methylene chloride. The resulting prepolymer is isolated from the reaction mixture in a simple manner by allowing the mixture to run into heated water at a speed causing at the same time continuous distillation of the solvent, such as methylene chloride. As a result thereof, the solvent is recovered quantitatively. The precipitated polyimide prepolymer is isolated by filtration, is washed with water to remove the hydrochloride of the acid binding agent therefrom, and is finally dried. The resulting prepolymer is soluble, for instance, in dimethyl formamide, dimethyl acetamide, acetone, N-methyl pyrrolidone, and other solvents. The viscosity of 50% solutions of the prepolymers in such solvents is between about 20 centistokes and about 150 centistokes.

A noteworthy advantage of this mode of operation over other processes consists in the substantially quantitative recovery of the solvent used for producing the prepolymer. As a result thereof the recovered solvent can directly be used in subsequent reactions. Methylene chloride as a low boiling, polar, water-immiscible solvent is used preferably for producing the polyimide prepolymerization products because most of the difunctional amines and of the imido-substituted acid halides are highly soluble therein, likewise most of the resulting novel polyimide prepolymers. Due thereto, products of uniform composition can be prepared in a well reproducible manner.

m-Maleic acid imido benzoic acid chloride and p-maleic acid imido benzoic acid chloride are the preferred acid halides for producing the prepolymers. This is due to the reactivity of their maleimido groups. Reaction of said maleic acid imido benzoic acid halides with aromatic difunctional amines as the preferred reactants in the molar proportion between about 1:1 and about 2:1 yields polyimide prepolymers which melt within the temperature range between about 80° C. and about 130° C. and which due thereto possess pronounced flow properties during molding. The fusibility and the rheological properties or flow characteristics of the polyimide prepolymers are variable in accordance with the variation of the molar proportions of difunctional amine to imido-substituted acid halide. It is readily possible to produce prepolymers which can be further processed under optimum conditions of application and manufacture.

The novel polyimide prepolymerization products can be converted into insoluble and infusible, cross-linked polyimides by heating the prepolymers to a temperature between about 100° C. and about 400° C. for a prolonged period of time until polymerization is completed. The polymerization of the prepolymers which consist substantially of the compounds according to Formulas II and III proceeds in such a manner that, on the one hand, the free amino groups react with the double bonds of the maleic acid moiety so that a linear reaction product of Formula IV given on the following page is produced. Said reaction product is subsequently hardened to yield the polyimide of Formula V by way of the unsaturated group R in a similar manner as curing of vinyl polymers proceeds. See the following page with the formulas showing the hardening pattern. In accordance with the reaction diagram given on said page hardening of the polyimide prepolymerization products proceeds by way of two partial reactions whereby preferably the free amino groups are first reacted and saturated and whereby subsequently vinyl polymerization takes place.

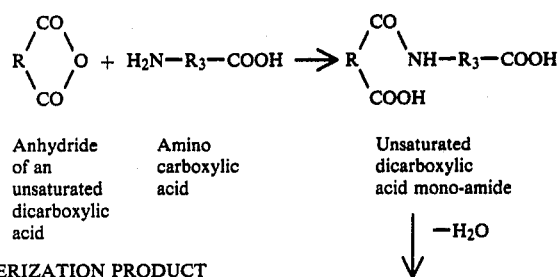

HARDENING DIAGRAM OF THE POLYIMIDE PREPOLYMERIZATION PRODUCT

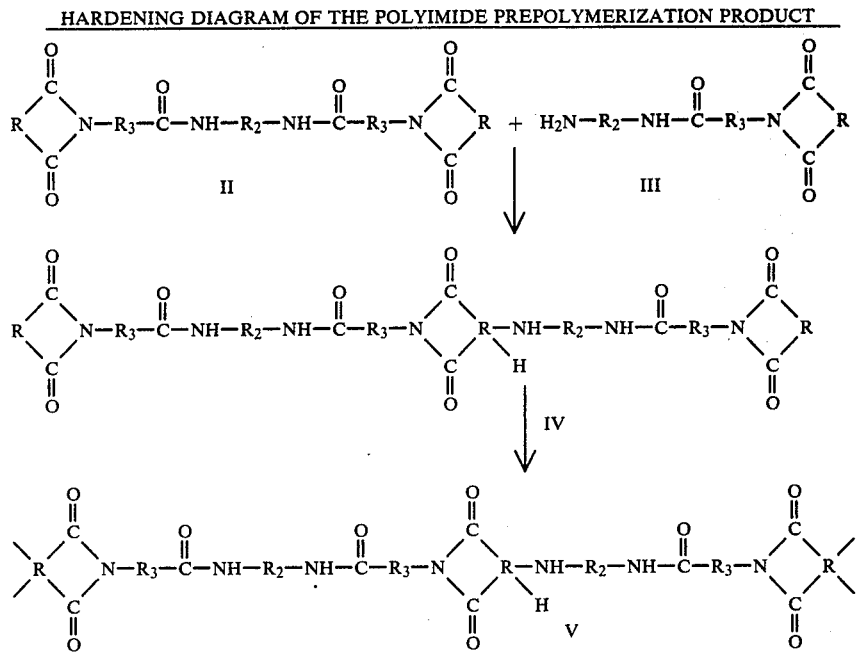

When using the resulting prepolymerization product as a molding composition which is molded under pressure and hardened, both reactions proceed simultaneously side by side. Therefore, the composition of the prepolymerization product must be such that, after hardening, no free primary amino groups are present therein. Otherwise polymers with optimum thermal and chemical properties are not obtained.

The novel polyimide prepolymers can also be used for producing molded laminated articles. For this purpose the polyimides are dissolved in high boiling organic solvents such as, for instance, N-methyl pyrrolidone, dimethyl formamide, dimethyl acetamide, or others. Glass fibers in the form of rowings or glass cloth, carbon fibers, boron fibers, or organic synthetic fibers in the form of woven fabrics, filaments, or rowings are impregnated with such solutions of the prepolymer. The impregnated fiber material is dried to remove the solvent and layers thereof are then subjected to the action of pressure and heat to yield molded laminated articles. In this case the macromolecular, crosslinked polyimide resin acts as bonding agent.

The unsaturated dicarboxylic acid imido carboxylic acid halogenides of the following formula

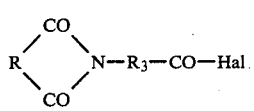

are prepared according to the following equations:

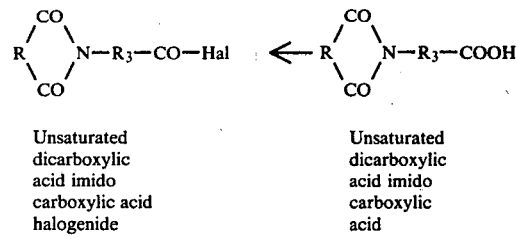

The reaction is carried out by first reacting the unsaturated dicarboxylic acid anhydride in an inert solvent with the respective amino carboxylic acid, converting the resulting amido carboxylic acid by means of an acid anhydride, preferably of acetic acid anhydride into the corresponding imido carboxylic acid, and converting the same into the acid halogenide by methods known to the art.

DESCRIPTION OF THE PREFERRED EMBODIMENTS

The following examples serve to illustrate the present invention without, however, being limited thereto.

EXAMPLE 1 m-Maleimido benzoylchloride 147 g. of maleic acid anhydride are dissolved in 3000 cc. of ethyl acetate. 206 g. of m-amino benzoic acid in solid form are gradually added to said solution within one hour while stirring. Stirring of the reaction mixture is continued at room temperature for 4 hours. The precipitated reaction product is filtered off by suction and is dried.

164.5 g. of the resulting m-maleic acid amido benzoic acid, 715 g. of acetic acid anhydride, and 23 g. of sodium acetate are heated at 80° C. for one hour. The resulting mixture is cooled to 50° C. 800 g. of water are added thereto. After cooling to room temperature, the precipitated reaction product is filtered off by suction, washed twice with 500 cc. of water, and dried in a vacuum at 70° C.

217.5 g. of m-maleimido benzoic acid obtained in this manner and 1200 g. of thionylchloride are heated to 60° C. while stirring vigorously. The reaction mixture is then heated at 60°–68° C. for 90 minutes until evolution of gas ceases. 225 cc. of toluene are added thereto and the reaction mixture is heated to between 82° C. and 100° C. whereby 580 cc. are distilled off. The thus concentrated reaction mixture is cooled to about 60°–70° C. 100 cc. of hexane are allowed to run thereinto at said temperature causing the resulting m-maleimido benzoylchloride to precipitate. It is filtered off by suction. The acid chloride has a melting point of 131°–134° C. Its chlorine content is 15.08% (theoretical chlorine content: 15.03%).

Other unsaturated dicarboxylic acid imido carboxylic acid halogenides are obtained as described hereinabove by replacing m-amino benzoic acid by equimolecular amounts of other amino carboxylic acids. Such other amino carboxylic acids are, for instance:

o-Amino benzoic acid,
p-amino benzoic acid,
3-methyl-4-amino benzoic acid,
3-ethyl-4-amino benzoic acid,
3-phenyl-4-amino benzoic acid,
3-chloro-4-amino benzoic acid,
3-fluoro-4-amino benzoic acid,
2-ethyl-4-amino benzoic acid,
2-chloro-4-amino benzoic acid,
4-methyl-3-amino benzoic acid,
5-methyl-3-amino benzoic acid,
2-methyl-5-amino benzoic acid, and other amino aryl carboxylic acids.

Aliphatic amino carboxylic acids can, of course, also be used, such as glycine and other α-amino alkyl carboxylic acids of the formula

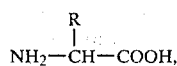

and in general amino alkyl carboxylic acids of the formula $$NH_2-X-COOH$$

in which

X is alkyl with 1 to 6 carbon atoms.

In place of maleic acid anhydride, there can be used as the other reactant other unsaturated dicarboxylic acid anhydrides such as the anhydrides of substituted maleic acids of the formula

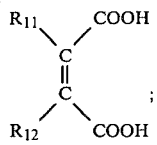

tetrahydrophthalic acids of the formula

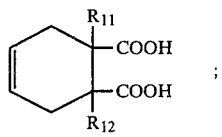

endomethylene tetrahydrophthalic acid of the formula

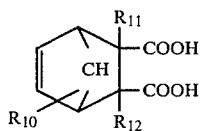

In said formulas $R_{10}$, $R_{11}$, and $R_{12}$ are hydrogen or lower alkyl with 1 to 6 carbon atoms.

EXAMPLE 2

119 g. (0.6 moles) of 4,4'-diamino diphenyl methane,
101 g. of triethylamine, and
350 cc. of methylene chloride are placed into a glass flask provided with a stirrer.

236 g. (1 mole) of m-maleimido benzoic acid chloride in solid form are added to said solution in such a manner that the reaction temperature does not exceed 25° C. After addition of the acid chloride, the reaction mixture is stirred at room temperature for thirty more minutes to about one hour and is caused to run into 800 cc. of water heated to 65° C., while stirring, in such a manner that methylene chloride is distilled off from the reaction mixture at the same time. 95% of the charged methylene chloride are recovered in this manner. The polyimide prepolymerization product which is insoluble in water is filtered off and is washed with cold water. The yield is quantitative. The product melts within a range between about 100° C. and 125° C. (determined by means of differential thermo-analysis DTA).

EXAMPLE 3

139 g. (0.7 moles) of 4,4'-diamino diphenyl methane,
101 g. of triethylamine, and
1000 cc. of methylene chloride are placed into a glass flask provided with a stirrer. A solution of 236 g. of p-maleimido benzoic acid chloride and
350 cc. of methylene chloride are caused to run into said solution in such a manner that the temperature does not exceed 25° C. The mixture is stirred at room temperature for one more hour and is caused to run into 500 cc. of water heated to 80° C., while stirring, in such a manner that the methylene chloride is distilled off from the reaction mixture at the same time. When proceeding in this manner, methylene chloride is recovered quantitatively. The precipitated yellow polyimide prepolymerization product is filtered off and is washed with water. The yield is quantitative.

The DTA melting range is between about 120° C. and about 140° C.

EXAMPLE 4

52.2 g. (0.21 moles) of 4,4'-diamino diphenyl sulfone,
30.3 g. of triethylamine, and
700 cc. of methylene chloride
are placed into a reaction vessel while stirring vigorously.

70.5 g. (0.30 moles) of m-maleimido benzoic acid chloride in solid form are added portion by portion thereto in such a manner that the temperature does not exceed 25° C. to 30° C. After continuing stirring at room temperature for one more hour, 2000 cc. of hexane are caused to run thereinto. The precipitated prepolymer is filtered off by suction, well washed with water, and dried at 50° C. in a vacuum. The yield is quantitative. The prepolymer has a DTA melting point of 90° C. to 115° C.

EXAMPLE 5

162 g. (1.5 moles) of m-phenylene diamine,
308 g. of triethylamine, and
500 cc. of methylene chloride
are placed into a reaction vessel provided with a stirrer.

150 to 160 g. of solid p-maleimido benzoic acid chloride are added portion by portion thereto. Thereupon 152 g. of isophthalic acid dichloride dissolved in 100 cc. of methylene chloride are added drop by drop thereto. Finally, a further amount of 193.5 to 203.5 g. of p-maleimido benzoic acid chloride are added thereto so that all in all about 1.5 moles of said mono-acid chloride are admixed. The resulting polyimide prepolymerization product is isolated and recovered by causing the reaction mixture to run into water heated to 75° C., while stirring, in such a manner that methylene chloride is distilled off at the same time. The yield, after filtration and drying, is quantitative. The methylene chloride is also recovered almost quantitatively.

EXAMPLE 6

52.2 g. (0.21 moles) of 3,3'-diamino diphenyl sulfone,
500 cc. of dioxane, and
30.3 g. of triethylamine
are placed into a reaction flask provided with stirrer.

90.45 g. (0.30 moles) of p-(endomethylene tetrahydrophthalimido) benzoic acid chloride
are added portion by portion thereto, while stirring. Stirring is continued at room temperature for about one hour. The reaction mixture is added to 700 cc. of water. The precipitate is filtered off by suction, washed with water, and dried.

EXAMPLE 7

When proceeding in the same manner as described in Example 6 but using 4,4'-diamino diphenyl sulfone and m-maleimido benzoylchloride as reactants, triethylamine as acid binding agent, and tetrahydrofuran as solvent, a prepolymer of the melting range between about 90° C. and 115° C. is obtained.

In place of the difunctional amines as they are employed as the one reactant in the preparation of the prepolymers according to Examples 2 to 7 hereinabove, namely of
4,4'-diamino diphenyl methane,
4,4'-diamino diphenyl sulfone, or
m-phenylene diamine,
there can be employed other aliphatic, cycloaliphatic, aromatic, or heterocyclic diamino compounds such as, for instance,
1,2-diamino ethane,
1,6-diamino hexane,
1,10-diamino decane,
1,12-diamino dodecane,
1,3-diamino cyclopentane,
1,4-diamino cyclohexane,
4,4'-diamino dicyclohexyl methane,
2,2,4-trimethyl hexamethylene diamine,
o-phenylene diamine,
m-phenylene diamine,
p-phenylene diamine,
benzidine,
3,3'-dimethyl benzidine,
3,3'-dimethoxy benzidine,
2,4-diamino toluene,
2,6-diamino toluene,
m-xylylene diamine,
p-xylylene diamine,
4,4'diamino diphenyl methane,
2,2-bis-(4-amino phenyl) propane,
bis-(p-amino phenyl)-1,1-cyclohexane,
4,4'-diamino diphenyl oxide,
sym.-m-diamino azoxybenzene,
4,4'-diamino diphenyl sulfide,
3,3'-diamino diphenyl sulfone,
4,4'-diamino azobenzene,
3,3'-diamino azobenzene,
bis-(4-amino phenyl) diphenyl silane,
bis-(4-amino phenyl) methyl phosphine oxide,
bis-(4-amino phenyl) phenyl phosphine oxide,
bis-(3-amino phenyl) phenyl phosphine oxide,
1,5-diamino naphthalene,
2,6-diamino pyridine,
2,5-diamino furane,
2,5-diamino pyrrole,
3,4-diamino thiophene,
and other bifunctional diamines.

The other reactant, i.e. the dicarboxylic acid imido acid halogenide is an acid halogenide which can be produced according to Example 1. In place of the m- or p-maleimido benzoylchloride used as the other reactant in Examples 2 to 7, there can be employed equimolecular amounts of the following acid halogenides:
o-maleimido benzoylchloride,
o-maleimido benzoylbromide,
m-maleimido benzoylbromide,
p-maleimido benzoylbromide,
o-tetrahydrophthalimido benzoylchloride,
m-tetrahydrophthalmido benzoylchloride,
p-tetrahydrophthalimido benzoylchloride,
o-endomethylene tetrahydrophthalimido benzoylchloride,
m-endomethylene tetrahydrophthalimido benzoylchloride,
p-endomethylene tetrahydrophthalimido benzoylchloride,
4-endomethylene tetrahydrophthalimido-3-phenyl benzoylchloride,
3-tetrahydrophthalimido-5-methyl benzoylchloride,
5-maleimido-2-methyl benzoylchloride,
(m-maleimido) acetylchloride,
α-(p-maleimido) propionylchloride,
or other unsaturated dicarboxylic acid imido carboxylic acid halogenides.

In place of methylene chloride used in Examples 2 to 7, there can be employed other inert solvents such as water-miscible solvents, for instance, acetone, tetrahydrofurane, dioxane, dimethyl formamide, dimethyl acetamide, dimethyl sulfoxide, tetramethylene sulfone, acetonitrile, and others, or water-immiscible, polar solvents, for instance, 1,1-dichloro ethylene, 1,1-dichloro ethane, 1,2-dichloro ethane, 1-chloro propane, 1-chloro-2-methyl propane, diethyl ether, isopropyl ether, cis-1,2-dichloro ethylene, 1,1,1-trichloro ethane, chloroform, carbon tetrachloride, benzene, toluene, xylene, cyclohexane, cyclohexanone, and others.

Although methylene chloride has proved to be the preferred solvent, other solvents can readily be selected by persons skilled in the art by simple preliminary experiments. If water-miscible solvents are used, the prepolymer is isolated from the reaction mixture by the addition of water causing the prepolymer to precipitate. It is then filtered off by suction and dried.

When using methylene chloride or a similar solvent with a boiling point below that of water, the reaction mixture is poured into water heated above the boiling point of the solvent as described in Example 2 to 5.

It is also possible to precipitate the prepolymer from the reaction mixture by the addition of a liquid, for instance, hexane in which the prepolymer is insoluble. In this case, there can be used in the preparation of the prepolymer solvents which need not have a boiling point below 100° C.

The solubility of the polyimide prepolymer is dependent to a considerable extent upon the structural composition of the reactants. If the reaction is carried out, for instance, in methylene chloride, acetone, tetrahydrofurane, dioxane, or the like solvents, usually a homogeneous solution is obtained because the triethylammonium chloride acts as a dissolving aid. If the reaction is carried out, for instance, in benzene, toluene, xylene, or the like solvents, the polyimide prepolymer precipitates during the reaction.

Depending upon the reaction conditions, the specific solvent used, the organic amine added as acid binding agent, and/or the reactants employed, the polyimide prepolymer may precipitate at least partly during its preparation. Or if complete solution of the prepolymer is achieved due to the dissolving aid of the hydrogen halide of the acid binding tertiary amine, complete precipitation is caused by the addition of water to the reaction solution. Likewise, when using a water-immiscible solvent, usually part of the prepolymer precipitates during the reaction while part of it is retained in solution by the dissolving aid of the hydrogen halide of the tertiary amine. In this case water addition to the reaction mixture causes complete precipitation of the polyimide prepolymer while the amine hydrogen halide remains in the aqueous phase. Accordingly it is not necessary to add precipitating agents to the reaction mixture.

In place of the isophthalic acid dichloride added during the reaction of the unsaturated dicarboxylic acid imido acyl monohalogenide with the diamine as described in Example 5, there can be used other dicarboxylic acid dihalogenides for producing polyimide prepolymers according to the present invention.

EXAMPLE 8

100 g. of the polyimide prepolymer prepared according to Example 2 are dissolved in N-methyl pyrrolidone to yield a 45% solution. The resulting solution has a viscosity of 18.0 centistokes. It is used for impregnating 16 cut specimens of glass fiber fabric, each specimen of a size of 16 cm.×16 cm. The glass fiber used was a woven glass fiber fabric of the type 92,100/A 1,100 of the firm INTERGLAS of Ulm, Federal Republic of Germany. After allowing excess impregnating solution to run off by vertically suspending the impregnated glass fiber fabric and drying it at 140° C. for 15 minutes, the resulting specimens impregnated with the prepolymer are stacked and placed layer upon layer into a molding press and are compressed under a pressure of 50 kp./sq.cm. at a temperature of 200° C. to 240° C. to a laminated glass fiber assembly in which the polyimide is the bonding agent.

The same solution is used in a similar manner for impregnating carbon fibers of the type Thornel 300, manufactured by UNION CARBIDE. The impregnated carbon fibers are deposited and converted into a pre-impregnated sheet material by means of the drum winding process under conditions under which the carbon fibers are placed unidirectionally and parallel side by side to each other. The solvent is removed by drying and heating to 120°–140° C. for about 15 minutes. Thereupon, the cut unidirectional carbon fiber layers impregnated with the prepolymer are placed layer upon layer into a mold and are compressed by a heated press to a laminated plate. The cooled plate has a fiber content of 64%, by volume, and a resin content of 36%, by volume. Its bending strength in the direction of the fibers amounts to 135–145 kp./sq.mm., its modulus of elasticity to 12,150 kp./sq.mm.

In place of N-methyl pyrrolidine used as solvent for impregnating the fibrous material, there can be employed other solvents such as dialkyl lower alkanoylamides and especially dimethyl formamide, dimethylacetamide, and others. Some of the polyimide prepolymers and especially those prepared by reaction with 4,4'- or 3,3'-diamino diphenylsulfone are soluble in acetone or the like alkanone solvents.

In place of the glass or carbon fibers employed for producing laminated molded articles, there can be used other fiber material such as boron fibers, asbestos fibers, or even organic synthetic fibers, while otherwise the procedure is substantially the same as described hereinabove.

EXAMPLE 9

50 g. of the polyimide prepolymerization product prepared according to Example 3 are intimately mixed in a ball mill with 10 g. of graphite powder. The mixture is molded under pressure in a cylindrical compression mold at 220°–250° C. After mold release, a molded article distinguished by its excellent physical properties is obtained. Its bending strength is 890 kp./sq.cm. Its modulus of elasticity for bending is $54 \times 10^3$ kp./sq.cm.

In place of the above mentioned graphite powder filler material for increasing the strength of the molded article, there can also be admixed quartz powder, aluminum oxide, iron powder, and other pulverulent materials of a ceramic and/or metallic type, likewise short glass or carbon fiber, asbestos, and organic fibers of a high modulus of elasticity, for instance, the product sold under the trademark KEVLAR 49 by E. I. DU PONT DE NEMOURS.

EXAMPLE 10

50 g. of the prepolymer obtained according to Example 7 by reacting 4,4'-diamino diphenylsulfone and m- maleimido benzoylchloride are molten by heating to 140° C. The melt is poured into a preheated steel mold to form a layer. Hardening is effected by heating the mold to 235° C. for about 4 hours. The resulting resin plate is insoluble in all organic solvents.

Other prepolymers according to the present invention can be molded and hardened in a similar manner as described in Examples 8 to 10. However, the conversion into the hardened polyimide resins is not limited to the specific conditions described in said examples.

Other conditions of molding, pressure, hardening temperature etc. as they are known in plastic article manufacture can also be used.

The novel prepolymers according to the present invention permit not only the production of shaped polyimide resin articles such as sheets, plates, laminated articles, or polyimide impregnated fibrous materials, or polyimide articles which are reenforced by fibrous or pulverulent fillers. They can also be used for producing foam-like articles. Their solutions can be used as agents for bonding metals, wood, porcelain, and other materials.

The time required for completely hardening the polyimide prepolymer can readily be determined by the differential thermal analysis method as described, for instance, by K.-H. Heinen and D. O. Hummel in "Kolloid-Zeitschrift und Zeitschrift fuer Polymere" vol. 251, pages 901–905 (1973). See also "Thermal Analysis of High Polymers" in "Journ. Polym. Sci." Part C, Polymer Symposia No. 6.

I claim:

1. In a process of producing a polyimide prepolymer, the step which comprises reacting a difunctional amine with an acid halide of the formula

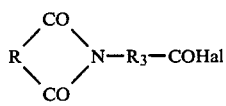

in which
Hal is halogen,
the group of the formula

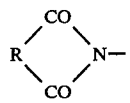

is an unsaturated dicarboxylic acid imido group, and the group of the formula $-R_3-CO-$ is an acyl group attached to the imido nitrogen atom,
to yield a polyimide prepolymer convertible by heating into a macromolecular polyimide.

2. The process of claim 1, in which the difunctional amine and the unsaturated dicarboxylic acid imido acid halide are reacted in the molar proportion between about 1:1 and about 1:2 at a temperature not substantially exceeding 100° C.

3. The process of claim 1, in which the reaction of the difunctional amine and the unsaturated dicarboxylic acid imido acid halide is carried out in a substantially inert, water-immiscible organic solvent of a boiling point not substantially exceeding 100° C. in the presence of a tertiary amine as acid binding agent.

4. The process of claim 3, in which the substantially inert, water-immiscible organic solvent is methylene chloride.

5. In the process of claim 3, the additional steps of introducing the resulting reaction mixture, while stirring, into water heated to a temperature above the boiling point of the solvent at a speed to cause simultaneous distillation of the solvent and precipitation of the polyimide prepolymer, and of separating the precipitated prepolymer from the resulting aqueous phase.

6. In the process of claim 4, the additional steps of introducing the resulting reaction mixture, while stirring, into water heated to a temperature above the boiling point of methylene chloride at a speed to cause simultaneous distillation of the methylene chloride and precipitation of the polyimide prepolymer, and of separating the precipitated prepolymer from the resulting aqueous phase.

7. The process of claim 1, in which the difunctional amine is an amine of the formula $$H_2N-R_3-NH_2$$

in which
$R_3$ is a member selected from the group consisting alkylene with 1 to 12 carbon atoms,
cycloalkylene with 5 to 6 carbon atoms,
a heterocyclic member with 4 to 5 carbon atoms and at least one oxygen, nitrogen, or sulfur atom in the heterocyclic ring,
a monocarboxylic or dicarbocyclic aromatic member,
at least two monocarbocyclic or dicarbocyclic aromatic or cycloalkylene members connected to each other by a carbon to carbon bond or by a divalent member selected from the group consisting of oxygen, sulfur, alkylene with 1 to 3 carbon atoms, and the groups of the formulas

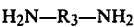
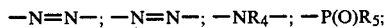
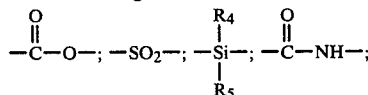
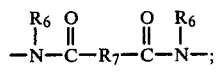
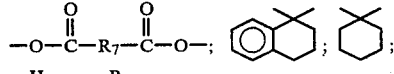
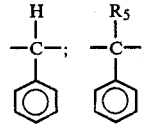

in which
$R_4$, $R_5$, and $R_6$ are members selected from the group consisting of alkyl with 1 to 6 carbon atoms, cycloalkyl with 5 to 6 carbon atoms, monocarbocyclic aryl, and dicarbocyclic aryl; and
$R_7$ is a member selected from the group consisting of alkylene with 1 to 12 carbon atoms, cycloalkylene with 5 to 6 carbon atoms, monocarbocyclic arylene, and dicarbocyclic arylene.

8. The process of claim 1, in which the acid halide is an acid halide of the formula

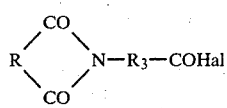

in which

R is a member selected from the group consisting of an unsaturated member of the formulas

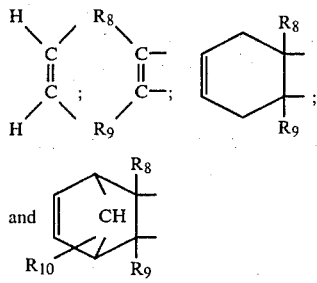

in which $R_8$, $R_9$, and $R_{10}$ are members of the group consisting of hydrogen and alkyl with 1 to 6 carbon atoms, Hal is halogen, and $R_3$ is the member indicated in claim 7.

9. The process of claim 1, in which the difunctional amine is 4,4'-diamino diphenyl methane and the acid halide is m-maleimido benzoylchloride.

10. The process of claim 1, in which the difunctional amine is 4,4'-diamino diphenyl methane and the acid halide is p-maleimido benzoylchloride and in which the molar proportion between amine and acid chloride is about 0.7:1.0.

11. The process of claim 6, in which the difunctional amine is 4,4'-diamino diphenyl methane and the acid halide is m-maleimido benzoylchloride.

12. The process of claim 11, in which the molar proportion of difunctional amine to acid chloride is about 0.6:1.

13. The process of claim 1, in which the difunctional amine is 4,4'-diamino diphenyl sulfone and the acid halide is m-maleimido benzoylchloride.

14. The process of claim 1, in which the difunctional amine is m-phenylene diamine and the acid halide is p-maleimido benzoylchloride.

15. In a process of producing a macromolecular, cross-linked, infusible polyimide resin being substantially insoluble in organic solvents, the step which comprises heating the polyimide prepolymer obtained according to the process of claim 1 until polymerization is completed.

16. The process of claim 15, in which the prepolymer is heated at a temperature between about 80° C. and about 400° C.

17. The process of claim 16, in which the polyimide prepolymer is heated under pressure.

* * * * *